H. C. HETHERINGTON AND J. M. BRAHAM.
METHOD OF MAKING AMMONIUM PHOSPHATE.
APPLICATION FILED JUNE 10, 1920.
1,369,763.
Patented Feb. 22, 1921.
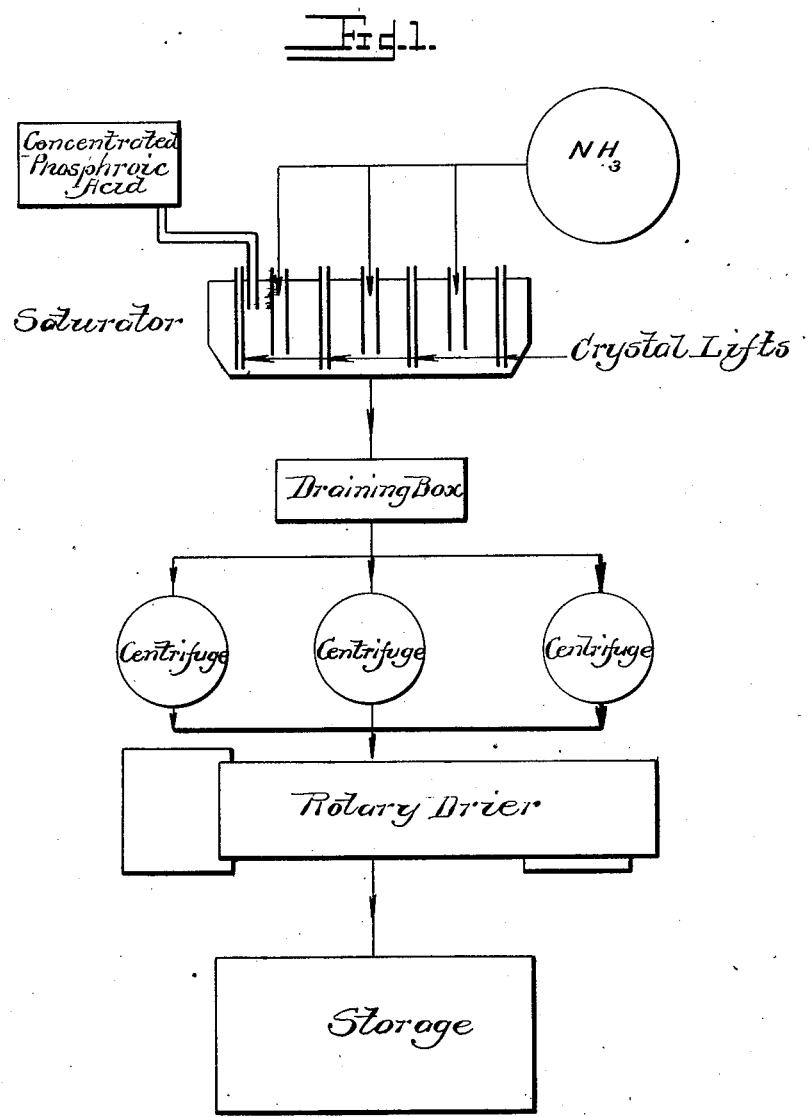
INVENTORS:
Harry C. Hetherington
Joseph M. Braham

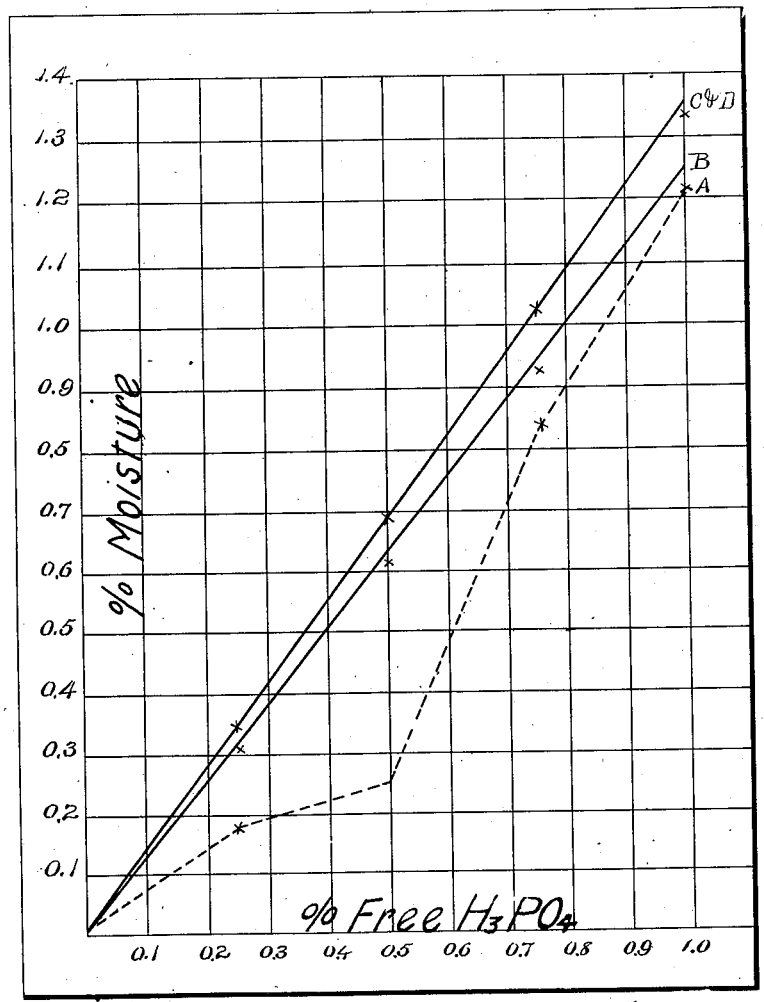
Hygroscopicity of Mono-Ammonium Phosphate at 30°C. and 80% relative Humidity Containing Various Amounts of free $H_3PO_4$
A = after 24 hrs.  C = after 72 hrs.
B = "   48 "   D = "   96 "

UNITED STATES PATENT OFFICE.

HARRY C. HETHERINGTON AND JOSEPH M. BRAHAM, OF WASHINGTON, DISTRICT OF COLUMBIA, ASSIGNORS TO THE UNITED STATES OF AMERICA.

METHOD OF MAKING AMMONIUM PHOSPHATE.

1,369,763.      Specification of Letters Patent.      Patented Feb. 22, 1921.

Application filed June 10, 1920. Serial No. 388,061.

*To all whom it may concern:*

Be it known that we, HARRY C. HETHERINGTON and JOSEPH M. BRAHAM, citizens of the United States, resident at Washington, in the District of Columbia, have invented a new and useful Improvement in Methods of Making Ammonium Phosphate, of which the following is a specification.

This invention relates to the manufacture of fertilizers and has for its principal objects the economical utilization therein of ammonia and concentrated phosphoric acid, both essential plant foods that are destined to soon become very important, if not the most important, sources of nitrogen and phosphorus for fertilizer purposes.

The two principal carriers now used for ammonia are sulfuric acid and phosphoric acid, the latter now being obtained by the action of sulfuric acid on phosphate rock. The cost of sulfuric acid as a carrier will always be comparatively high, especially so if one takes into consideration the fact that for most soils sulfuric acid possesses no fertilizing value, being somewhat injurious to the acid soils.

Phosphoric acid is unquestionably the most desirable carrier of ammonia for the following reasons: (1) It in itself is, as above stated, one of the essential plant foods, (2) it forms a stable compound with ammonia, having excellent physical properties, (3) it gives a very concentrated plant food with much lower costs for storage, bagging, and transportation than any other fertilizer now used, and (4) in the future, phosphoric acid will almost certainly be made at such a cost as to displace sulfuric acid for economic reasons alone.

Phosphoric acid, as is well known, combines with ammonia to form mono, di, or tri-ammonium phosphate the composition of the compound obtained depending principally on the concentration of acid and the temperature. Of these compounds only the first two are of commercial importance, the triammonium phosphate being extremely unstable under ordinary conditions.

We are aware that it has been proposed to manufacture ammonium phosphates, particularly the di and mono-ammonium phosphates, by neutralizing phosphoric acid of relatively low concentration, and not exceeding 59.3% $H_3PO_4$ (43% $P_2O_5$), with ammonia gas. (See in this connection the processes described in Patents Nos. 1,142,068 and 1,264,513.) Such processes, however, are not only dependent for their economical operation upon a cheap supply of phosphate rock and sulfuric acid, but they include a relatively expensive evaporation step as well. Furthermore, when employing such low concentration of phosphoric acid, it is extremely difficult to produce a uniform product consisting essentially of mono-ammonium phosphate $(NH_4)H_2PO_4$, which is remarkably stable and substantially non-hygroscopic at ordinary temperatures, without also producing considerable quantities of di-ammonium phosphate $(NH_4)_2HPO_4$, which salt is relatively unstable, losing $NH_3$ readily at ordinary temperatures and is also efflorescent.

Our investigations have led to the discovery of a simple, efficient and expeditious method of producing a stable non-hygroscopic mono-salt, in a high state of purity, practically uncontaminated with di-ammonium phosphate, the same being fully set forth in the following detailed description and drawings forming a part thereof, in which—

Figure 1 is a flow sheet, bearing explanatory legends, graphically representing our method of making such mono-salt, and Fig. 2 is a plotted representation showing the hygroscopicity of mono-ammonium phosphate containing varying amounts of free phosphoric acid.

In practising our invention, we preferably proceed as follows:

A solution of crude phosphoric acid, having an initial concentration of between 68% and 72% $H_3PO_4$, or somewhat higher if the ammonia gas carries appreciable quantities of moisture or if heat is lost too rapidly from the saturator, is constantly fed into the saturator through the acid and gaseous ammonia is constantly fed into the body of acid, preferably adjacent the bottom portion thereof, and the quantities of each are so regulated that the solution in the saturator is preferably maintained slightly acid as a little di-ammonium salt forms prior to the addition of the calculated amount of ammonia necessary for complete conversion to the mono-ammonium salt. The crystals are continuously removed from the solution, while the latter is slightly acid, by suitable lifts and consequently any contamination with crystals of di-ammonium phosphate is avoided.

Owing to the amount of heat generated by the highly concentrated acid employed in our process, it is possible to dispense with a separate evaporation step and to accomplish the neutralization, crystallization and evaporation in the vessel without resorting to artificial heating. For example it is possible to obtain temperatures ranging from about 108° C. when employing 60% phosphoric acid to 192° when employing 85% acid and the intermediate temperature ranges of about 119° to 122.5° C. corresponding to 68 to 72% acid are preferred as at such temperatures there is no appreciable formation of the di-ammonium salt nor over-concentration with its attendant danger of the crystals occluding viscous acid which would render the salt sticky and difficult to remove from the saturator as well as more hygroscopic.

The crystals of the mono-ammonium phosphate removed from the saturator are drained in the ordinary manner and then centrifuged to remove the mother liquor therefrom while the free acid in the crystals is reduced by centrifuging alone to about 0.1% to 0.5% and for most purposes no further treatment is required. A further drying of the salt may of course be resorted to in those cases where a still drier product is required.

The elimination of the separate evaporation enables us to dispense with the accurate adjusting of the solution immediately after the solution leaves the saturator. In the process, heretofore employed, such an adjustment was necessary in order to eliminate excess ammonia or excess acid, since no further opportunity was afforded for the elimination at any later stage of the process.

While in our process, in which as stated the solution in the saturator is substantially acid, the crystals obtained therefrom will carry a small quantity of free phosphoric acid, such acid can be practically all removed simultaneously with the water by centrifuging and consequently the accurate neutralization required in processes such for example as described in aforesaid Patent No. 1,142,068 is not required. In fact, we are able to obtain excellent results with an acidity corresponding to an excess of phosphoric acid of 3 per cent. by weight of the mixture in the saturator.

By proper centrifuging it is possible to produce a product, without further drying, having a moisture content below 3%, though if desired the product may be dried in suitable driers, as for example rotary driers such as now used for ammonium sulfate.

In our process the temperature of the solution in the saturator is a highly important factor in controlling the formation of the mono-salt to the exclusion of the di-salt so it is necessary to either indirectly control the same by regulating the rate of flow of the gaseous ammonia into the acid as well as the concentration of the acid or else to directly control the same independently of these factors. However, this latter method of control would not only be difficult on a commercial scale but probably impracticable and accordingly we prefer to control the temperature by supplying phosphoric acid of a uniform concentration to the saturator and supplying gaseous ammonia as rapidly as is consistent with the substantially complete absorption thereof, since too slow a rate of flow would result in too low a temperature which would in turn, as above noted favor the formation of the di-ammonium salt. The ammoniation is stopped at the point at which the system contains $(NH_4)H_2PO_4$ with but a very small amount of free $H_3PO_4$, preferably not exceeding 3% of free $H_3PO_4$.

In practice we have found that the avidity of the phosphoric acid for absorption of the ammonia will vary materially with the stage of neutralization reached, being smallest in the early stages and increasing when heavy crystallization occurs.

It might be desirable to operate the process in such a way as exactly to neutralize the primary hydrogen, nevertheless, such accurate control is unnecessary in our process and accordingly when operating on a commercial scale it is merely necessary to stop the ammoniation at that point where the system remains slightly acid thus insuring against over-neutralization, for example the ammoniation may be stopped when the acidity of the mixture in the saturator has been reduced to a point corresponding to 3% of free phosphoric acid therein.

The mono-ammonium phosphate product obtainable by our process is, owing to its low content of free phosphoric acid, which as shown in the chart in the accompanying drawings directly affects the hygroscopicity, and contrary to what would be expected in view of numerous statements in the literature of the art as to the undesirable hygroscopicity of mono-ammonium phosphate, extremely non-hygroscopic as well as fine grained, being between 20 and 40 mesh, soluble in the proportions of about 170 parts in 100 parts of water and extremely stable upon atmospheric exposure at ordinary temperature, losing $NH_3$ very slowly even at 110° C. in a current of air.

It is recognized that ammonium sulfate containing 0.5% free $H_2SO_4$ can be satisfactorily stored in bags and accordingly it is evident there will be no difficulty to be met with in those cases where the product produced by our process contains 0.5% of phosphoric acid—a weaker acid.

While, as stated, we prefer to operate under such conditions that the temperature of the solution will attain 119° to 122.5° C., very satisfactory results can be obtained at even lower temperature but not below 105° C., at which latter point the formation of di-ammonium phosphate is so abundant as to be objectionable.

While our process is preferably conducted as a continuous process with fresh phosphoric acid and ammonia being constantly supplied in the proper quantity to replace the mono-ammonium phosphate removed from the saturator, the operation may be made an intermittent one if desired. Furthermore, if the autogenous heat developed is insufficient for the desired purposes, extraneous heat may be supplied.

Various other modifications may be made without departing from the spirit of the invention as herein claimed.

Having thus described our invention, what we claim and desire to procure by Letters Patent is:

1. The process of making mono-ammonium phosphate, which consists in providing a concentrated solution of phosphoric acid containing at least 60% $H_3PO_4$, supplying sufficient gaseous ammonia thereto to form mono-ammonium phosphate and a slight excess of phosphoric acid in the mixture, maintaining the solution at a temperature in excess of 105° C. and at a concentration sufficient to promote the separation of such mono-ammonium phosphate in its solid phase and recovering such mono-ammonium phosphate in its solid phase.

2. The process of making mono-ammonium phosphate, which comprises introducing gaseous ammonia into a body of concentrated phosphoric acid containing at least 60% of $H_3PO_4$, the speed of introduction of such ammonia being sufficient to generate sufficient heat of neutralization to elevate the temperature of the mixture to at least 105° C. and the quantity of ammonia introduced being such as to almost but not quite correspond to the quantity of ammonia required to combine with such acid to form $(NH_4)H_2PO_4$, and then recovering monoammonium phosphate in its solid phase from said mixture.

3. The process of making mono-ammonium phosphate, which comprises the causing of gaseous ammonia to react with concentrated phosphoric acid, the concentration of the acid and the speed of introduction of the ammonia thereto being sufficient to autogenously generate sufficient heat to elevate the mixture to a temperature in excess of 105° C. and to cause evaporation of the aqueous content of the mixture to such an extent that when the quantity of ammonia brought into contact with the phosphoric acid almost but not quite corresponds to the quantity of ammonia required to combine with such acid to form $(NH_4)H_2PO_4$, the temperature and the concentration of the mixture will be such that mono-ammonium phosphate will separate out in its solid phase.

4. The process of making mono-ammonium phosphate, which consists in causing ammonia to react with concentrated phosphoric acid containing at least 60% $H_3PO_4$, the rate of introduction of the ammonia to the phosphoric acid being sufficient to elevate the temperature of the mixture to at least 105° C. and the quantity of ammonia introduced being such as to almost but not quite correspond to that required by the formula $(NH_4)H_2PO_4$ and then recovering mono-ammonium phosphate in its solid phase from said mixture.

5. The process of making mono-ammonium phosphate, which consists in maintaining slightly acid solution of mono-ammonium phosphate at a temperature in excess of 105° C. and at a concentration sufficient to promote the separation of mono-ammonium phosphate in its solid phase from said solution, recovering the separated mono-ammonium phosphate in its solid phase and then separating the adhering mother-liquor from said recovered product.

6. The continuous process of making mono-ammonium phosphate, which consists in providing a slightly acid solution of mono-ammonium phosphate at a temperature in excess of 105° C. and at a concentration sufficient to promote the separation of mono-ammonium phosphate in its solid phase from said solution, recovering the separated mono-ammonium phosphate in its solid phase, then supplying fresh portions of concentrated phosphoric acid containing at least 60% $H_3PO_4$ and ammonia in such proportions that the solution still remains slightly acid and at such a rate that the temperature of the solution remains in excess of 105% C. and the concentration is sufficient to promote the separation of further mono-ammonium phosphate in its solid phase from said solution, and then recovering the separated mono-ammonium phosphate so produced in its solid phase from said solution.

Signed at Washington, in the District of Columbia this 21st day of February, 1920.

HARRY C. HETHERINGTON.
JOSEPH M. BRAHAM.